United States Patent Office 2,891,071
Patented June 16, 1959

2,891,071

LOWER ALKYL QUATERNARY AMMONIUM SALTS OF 2,2,4-TRIMETHYL-α,α-DIPHENYL-1-PYRROLIDINEBUTYRAMIDE

Brooke D. Aspergren and Robert B. Moffett, Kalamazoo, Mich., assignors to The Upjohn Company, Kalamazoo, Mich., a corporation of Michigan No Drawing. Application November 19, 1956
Serial No. 622,824

3 Claims. (Cl. 260—326.3)

The present invention relates to novel organic compounds and is more particularly concerned with the novel 2,2,4 - trimethyl - α,α-diphenyl-1-pyrrolidinebutyronitrile free base, 2,2,4-trimethyl-α,α-diphenyl-1-pyrrolidinebutyronitrile acid additive salts, 2,2,4-trimethyl-α,α-diphenyl-1-pyrrolidinebutyramide free base, and 2,2,4-trimethyl-α,α-diphenyl-1-pyrrolidinebutyramide lower-alkyl quaternary ammonium salts.

The 2,2,4-trimethyl-α,α-diphenyl-1-pyrrolidinebutyronitrile free base and acid addition salts thereof, and 2,2,4-trimethyl-α,α-diphenyl-1-pyrrolidinebutyramide free base are useful intermediates for the preparation of 2,2,4-trimethyl-α,α-diphenyl-1-pyrrolidinebutyramide lower-alkyl quaternary ammonium salts. The quaternary ammonium salts of the present invention possess excellent antispasmodic activity and weak antisecretory activity. This is in contrast to the activity shown by quaternary ammonium salts of closely related unsubstituted amides, i.e., primary amides, which do not have a combination of excellent antispasmodic activity and weak antisecretory activity, but instead combine, e.g., low antispasmodic with low antisecretory activity, or good antispasmodic with good antisecretory activity. Thus, the quaternary ammonium salts of the present invention are indicated for those situations in which pronounced antispasmodic activity is desired and antisecretory activity is held to a minimum.

The data given in Table I are illustrative of the differentiating effects noted above. The antispasmodic index was determined by intravenous administration to Thiry-Vella dogs and equated to atropine equals 1.0 (low values means low activity). The antisecretory activity was determined intravenously in rats and is given as the $ED_{50}$ in mg./kg.—the effective dose necessary to reduce gastric secretion by fifty percent (low values mean high activity).

The data in Table I show that 2,2,4-trimethyl-α,α-diphenyl-1-pyrrolidinebutyramide methobromide possesses an unique combination of properties which would not be expected from the properties of closely related compounds including an adjacent homologue and an isomer. Thus the quaternary ammonium salts of the invention possess a combination of unusually high antispasmodic activity and low antisecretory activity which is not possessed by the related compounds. For example, compounds A and C combine low antispasmodic activity with low antisecretory activity. Compound B on the other hand combines good antispasmodic activity with an antisecretory activity about sixty times greater than that of the compound of the present invention.

TABLE I

| Compound | Anticholinergic Activity | |
|---|---|---|
| | Antispasmodic Index | Antisecretory Activity |
| (main compound structure) | 4–6 | 0.2 |
| *Related Compounds* | | |
| A. (structure) | 1.0 | 0.2 |
| B. (structure) | 4.0 | 0.003 |
| C. (structure) | 1.0 | 0.2 |

In preparing the compounds of the present invention diphenylacetonitrile is reacted with 1-(2-chloroethyl)-2,2,4-trimethylpyrrolidine in the presence of an alkali metal amide, advantageously lithium amide, to produce 2,2,4-trimethyl-α,α-diphenyl - 1 - pyrrolidinebutyronitrile free base. This free base can be converted in known manner to acid addition salts such as the hydrochloride, hydrobromide, sulfate, acetate, phosphate, citrate, lactate, and the like. This free base or an acid addition salt thereof is hydrolyzed to produce 2,2,4-trimethyl-α,α-diphenyl-1-pyrrolidinebutyramide free base, according to the procedure of Cheney et al., J. Org. Chem. 17, 770 (1952). The desired 2,2,4-trimethyl-α,α-diphenyl-1-pyrrolidinebutyramide lower-alkyl quaternary ammonium salts are thereupon produced by reacting the free base in an inert solvent such as benzene with a quaternary ammonium salt-producing compound such as methyl chloride, methyl iodide, ethyl bromide, methyl bromide, methyl p-toluenesulfonate, butyl iodide, ethyl sulfate, ethyl iodide, and the like. The starting reactant, 1-(2-chloroethyl)-2,2,4-trimethylpyrrolidine, can readily be prepared from its hydrochloride, which in turn can be prepared by reacting 2,2,4-trimethyl-1-pyrrolidineethanol hydrochloride with thionyl chloride [Moffett et al., J. Org. Chem. 17, 407 (1952)].

The following example is illustrative of the process and products of the present invention, but is not to be construed as limiting.

*Example.—Preparation of 2,2,4-trimethyl-α,α-diphenyl-1-pyrrolidinebutyramide methobromide*

A. 1-(2-CHLOROETHYL)-2,2,4-TRIMETHYLPYRROLIDINE HYDROCHLORIDE

Gaseous hydrogen chloride was passed into a solution of 42 grams (0.267 mole) of 2,2,4-trimethyl-1-pyrrolidine-ethanol (Moffett et al., supra) in 200 milliliters of benzene, with stirring and ice-bath cooling, until the solution was strongly acidic. With continued stirring and cooling, 24.5 grams (0.4 mole) of thionyl chloride was gradually added, and the reaction mixture was heated at reflux temperature for two hours. About fifty milliliters of solvent was removed by distillation and the mixture was cooled. The resulting crystalline 1-(2-chloroethyl)-2,2,4-trimethylpyrrolidine hydrochloride was collected, washed with anhydrous ether, and dried. The yield was 55.3 grams (98 percent); and the compound melted at 162 to 165 degrees centigrade. After recrystallization from isopropanol the product melted between 164 and 166 degrees centigrade.

*Analysis.*—Calculated for $C_9H_{19}Cl_2N$: C, 50.95; H, 9.03; Cl, 33.42; N, 6.60. Found: C, 51.29; H, 9.19; Cl, 33.22; N, 6.96.

B. 2,2,4-TRIMETHYL-α,α-DIPHENYL-1-PYRROLIDINE-BUTYRONITRILE FREE BASE

To a slurry of 7.0 grams of lithium amide in 400 milliliters of dry toluene was added 44.45 grams (0.23 mole) of diphenylacetonitrile in a three-necked, three-liter flask equipped with reflux condenser and stirrer, and the resulting mixture was stirred under reflux for four hours. A 48.7-gram (0.23 mole) portion of 1-(2-chloroethyl)-2,2,4-trimethylpyrrolidine hydrochloride (part A, this example) was converted to the free base by treatment with aqueous fifty percent sodium hydroxide solution, and the free base was extracted into 200 milliliters of toluene. This toluene solution was dried and gradually added to the aforesaid slurry, and the reaction mixture was heated at reflux temperature for eighteen hours. The mixture was cooled, washed with 300 milliliters of water, and then extracted with dilute hydrochloric acid prepared by mixing fifty milliliters of concentrated acid and 250 milliliters of water. The acid extract was made alkaline by adding 200 milliliters of twenty percent sodium hydroxide solution, and the mixture was extracted with benzene. The benzene extract was dried with anhydrous sodium sulfate, the benzene was removed by distillation, and the residual oil was distilled under reduced pressure. There was thus obtained 2,2,4-trimethyl-α,α-diphenyl-1-pyrrolidinebutyronitrile free base having a boiling point of 150 to 155 degrees centigrade at 0.05 millimeter pressure and $n_D^{25}=1.5473$.

*Analysis.*—Calculated for $C_{23}H_{28}N_2$: C, 83.08; H, 8.49; N, 8.43. Found: C, 81.99; H, 8.76; N, 8.91.

C. 2,2,4-TRIMETHYL-α,α-DIPHENYL-1-PYRROLIDINE-BUTYRONITRILE HYDROCHLORIDE

The procedure of part B, above, was repeated except that the residual oily free base was not distilled. This free base was dissolved in ethyl acetate and a slight excess of ethanolic hydrogen chloride was added. The resulting precipitate was recrystallized from ethyl acetate. There was thus obtained a 71.5 percent overall yield of 2,2,4-trimethyl-α,α-diphenyl-1-pyrrolidinebutyronitrile hydrochloride having a melting point of 188 to 190 degrees centigrade.

*Analysis.*—Calculated for $C_{23}H_{29}ClN_2$: C, 74.87; H, 7.29; N, 7.59; Cl, 9.61. Found: C, 73.90; H, 7.60; N, 7.54; Cl 9.36.

Following the procedure of part C, above, other acid addition salts such as 2,2,4-trimethyl-α,α-diphenyl-1-pyrrolidinebutyronitrile sulfate, 2,2,4-trimethyl-α,α-diphenyl-1-pyrrolidinebutyronitrile hydrobromide, 2,2,4-trimethyl-α,α-diphenyl-1-pyrrolidinebutyronitrile acetate, 2,2,4-trimethyl-α,α-diphenyl-1-pyrrolidinebutyronitrile phosphate, 2,2,4-trimethyl-α,α-diphenyl-1-pyrrolidinebutyronitrile citrate, 2,2,4-trimethyl-α,α-diphenyl-1-pyrrolidinebutyronitrile lactate, and the like, can be produced by substituting the corresponding acid for hydrogen chloride.

D. 2,2,4-TRIMETHYL-α,α-DIPHENYL-1-PYRROLIDINE-BUTYRAMIDE FREE BASE

A solution of 154 milliliters of 98 percent sulfuric acid and 15.4 milliliters of water was added to ninety grams (0.245 mole) of 2,2,4-trimethyl-α,α-diphenyl-1-pyrrolidinebutyronitrile hydrochloride, part C, in a one-liter, three-necked flask with stirrer and reflux condenser and the mixture was heated on a steam bath for four hours. The reaction mixture was poured over crushed ice and made basic by the addition of one liter of concentrated ammonium hydroxide. The precipitate, 2,2,4-trimethyl-α,α-diphenyl-1-pyrrolidinebutyramide free base, was recovered by filtration, and was recrystallized from isopropanol. The yield was 69.5 grams (81.5 percent) and the product melted between 125 and 127 degrees centigrade.

*Analysis.*—Calculated for $C_{23}H_{30}N_2O$: C, 78.81; H, 8.63; N, 8.00. Found: C, 78.77; H, 8.39; N, 8.29.

E. 2,2,4-TRIMETHYL-α,α-DIPHENYL-1-PYRROLIDINE-BUTYRAMIDE METHOBROMIDE

To a cold solution of eight grams of 2,2,4-trimethyl-α,α-diphenyl-1-pyrrolidinebutyramide free base, part D, in 100 milliliters of benzene was added fifty grams of cold methyl bromide. The mixture was allowed to stand in a stoppered flask for 48 hours at about 25 degrees centigrade. The mixture was filtered and the recovered precipitate was washed with ether and dried. This product, 2,2,4-trimethyl-α,α-diphenyl-1-pyrrolidinebutyramide methobromide, weighed 9.8 grams (96 percent), and had a melting point of 225 to 226 degrees centigrade.

*Analysis.*—Calculated for $C_{24}H_{33}BrN_2O$: C, 64.71; H, 7.46; Br, 17.94; N, 6.29. Found: C, 64.73; H, 7.76; Br, 17.50; N, 6.13.

Following the procedure of part E, above, other lower-alkyl quaternary ammonium salts such as 2,2,4-trimethyl-α,α-diphenyl-1-pyrrolidinebutyramide ethobromide, 2,2,4-trimethyl-α,α-diphenyl-1-pyrrolidinebutyramide methochloride, 2,2,4-trimethyl-α,α-diphenyl-1-pyrrolidinebutyramide ethosulfate, 2,2,4-trimethyl-α,α-diphenyl-1-pyrrolidinebutyramide methiodide, 2,2,4-trimethyl-α,α-diphenyl-1-pyrrolidinebutyramide ethiodide, 2,2,4-trimethyl-α,α-diphenyl-1-pyrrolidinebutyramide methyl p-toluenesulfonate, 2,2,4-trimethyl-α,α-diphenyl-1-pyrrolidinebutyramide butyl iodide, and the like, can be produced by substituting the corresponding lower-alkyl quaternary ammonium salt-producing compound for methyl bromide.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. 2,2,4-trimethyl-α,α-diphenyl-1-pyrrolidinebutyramide free base.

2. 2,2,4-trimethyl-α,α-diphenyl-1-pyrrolidinebutyramide lower-alkyl quaternary ammonium salts.

3. 2,2,4-trimethyl-α,α-diphenyl-1-pyrrolidinebutyramide methobromide.

References Cited in the file of this patent

UNITED STATES PATENTS 2,782,206     Aspergren et al.           Feb. 19, 1957